US006690539B2

(12) United States Patent
Gallo et al.

(10) Patent No.: US 6,690,539 B2
(45) Date of Patent: Feb. 10, 2004

(54) PORTABLE DATA STORAGE DRIVE CARTRIDGE WITH EXTERNAL INTERFACE AT EACH END

(75) Inventors: Frank David Gallo, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 09/910,815

(22) Filed: Jul. 24, 2001

(65) Prior Publication Data

US 2003/0021058 A1 Jan. 30, 2003

(51) Int. Cl.[7] .............................................. G11B 17/00
(52) U.S. Cl. ..................................... 360/97.01; 361/686
(58) Field of Search ...................... 360/97.01, 97.02, 360/97.03, 97.04, 98.01, 137; 361/685, 686

(56) References Cited

U.S. PATENT DOCUMENTS

| | | | |
|---|---|---|---|
| 4,359,762 A | | 11/1982 | Stollorz ........................ 360/98 |
| 4,527,262 A | | 7/1985 | Manto .......................... 369/33 |
| 4,754,397 A | | 6/1988 | Varaiya et al. ............... 364/200 |
| 5,223,996 A | * | 6/1993 | Read et al. ............... 360/97.02 |
| 5,253,133 A | | 10/1993 | Guo .......................... 360/97.01 |
| 5,513,073 A | * | 4/1996 | Block et al. ................. 361/719 |
| 5,619,486 A | * | 4/1997 | Uno et al. .................. 369/75.1 |
| 5,646,801 A | * | 7/1997 | Boigenzahn et al. .... 360/97.01 |
| 5,913,926 A | * | 6/1999 | Anderson et al. ............... 714/6 |
| 6,034,926 A | * | 3/2000 | Dang et al. .............. 369/30.34 |
| RE36,968 E | * | 11/2000 | Shieh ........................ 361/685 |
| 6,270,354 B2 | * | 8/2001 | Li et al. ........................ 439/55 |
| 6,307,743 B1 | * | 10/2001 | Aizawa et al. .............. 361/685 |

FOREIGN PATENT DOCUMENTS

| | | | |
|---|---|---|---|
| JP | 3-076081 | 4/1991 | |
| JP | 4-125884 | 4/1992 | |
| JP | 5-189861 | 7/1993 | |
| JP | 8-147069 | 6/1996 | |
| JP | 408147069 A | * 6/1996 | ............. G06F/1/16 |

OTHER PUBLICATIONS

Locating Cartridges in Dual–Ported Bins of Automated Storage Libraries, IBM Technical Disclosure Bulletin, vol. 37, No. 06B, Jun. 1994, p 51ff.
Data Storage Library With Picker Containing Media Reader, IBM Technical Disclosure Bulletin, vol. 38, No. 10, Oct. 1995, p 95ff.

* cited by examiner

*Primary Examiner*—Brian E. Miller
(74) *Attorney, Agent, or Firm*—John H. Holcombe

(57) ABSTRACT

A portable data storage drive cartridge has external interfaces positioned respectively at opposite ends of a cartridge shell. They may be arranged to be similar when the cartridge is rotated end over end to a reverse direction with respect to the opposite ends. A data storage drive, such as a magnetic disk drive assembly, having an interface, is positioned in the cartridge shell with the drive interface positioned toward a first end and away from a second end of the opposite ends of the cartridge shell. Flex cables extend from the drive interface, a first extending from the drive interface around the drive to the external interface at the second end of the cartridge shell, and a second extending from the drive interface, initially around the drive toward the second end, and reversing direction and extending back to the external interface at the first end of the cartridge shell.

24 Claims, 6 Drawing Sheets

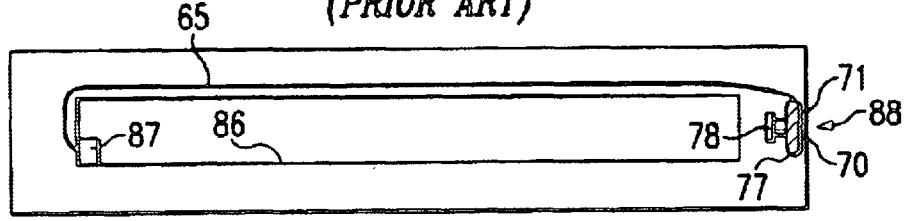
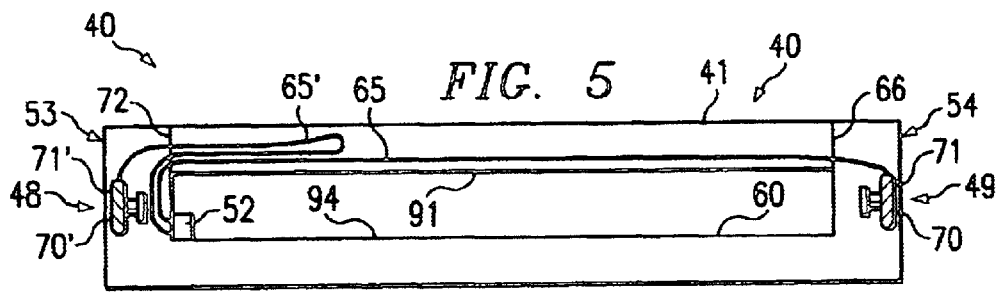
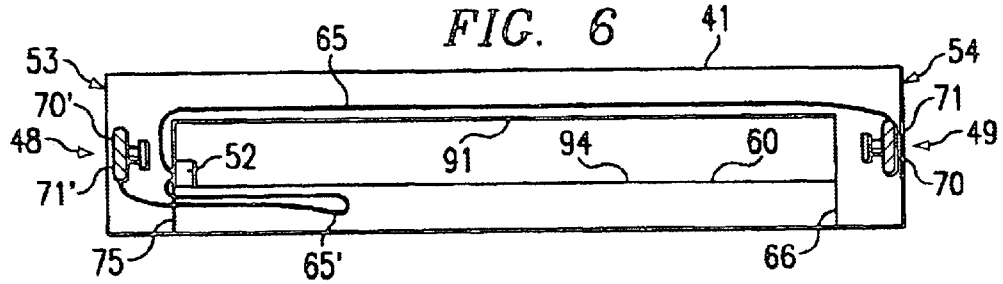
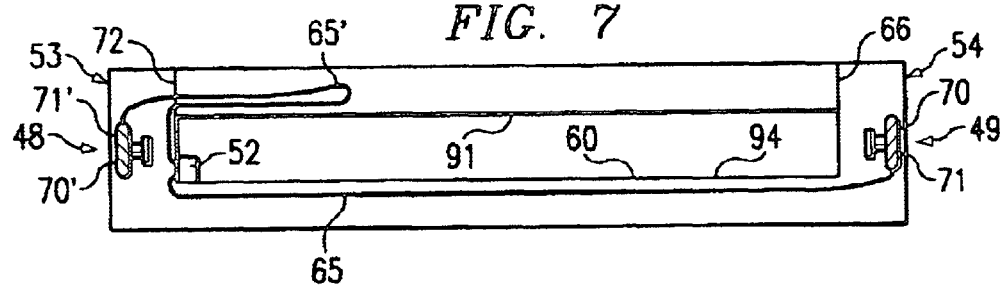
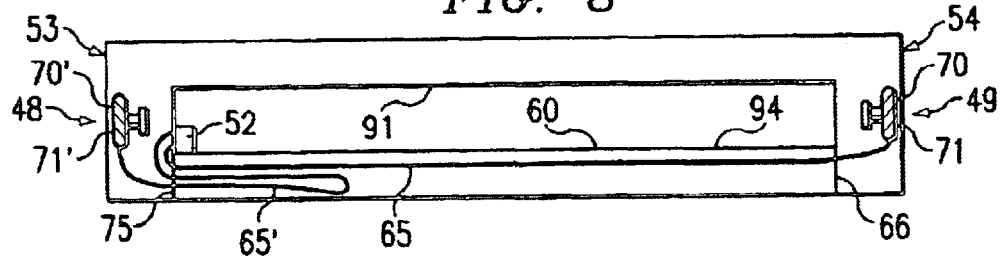

PORTABLE DATA STORAGE DRIVE CARTRIDGE WITH EXTERNAL INTERFACE AT EACH END

FIELD OF THE INVENTION

This invention relates to portable data storage cartridges having data storage drives contained therein, and, more importantly, to the provision of an external interface for a portable data storage cartridge which is coupled to the data storage drive contained in the cartridge.

BACKGROUND OF THE INVENTION

Portable data storage cartridges typically comprise a data storage media, such as magnetic tape, which are inserted into a separate data storage drive so that data may be read and/or written on the data storage media. Such cartridges are convenient means of storing large quantities of data which are accessed occasionally. They are particularly useful in automated data storage libraries which can contain large numbers of the cartridges on storage shelves, and which employ a robot accessor to access a cartridge when needed and deliver the cartridge to a data storage drive.

The typical portable cartridge employs a data storage media, such as a length of magnetic tape, and must be inserted into the data storage drive, opened, and the tape wound or rewound to gain access to the desired data. Should access be desired to additional data on the length of tape, the tape again must be wound or rewound to gain access to the desired data.

It is well known to those of skill in the art that a magnetic disk drive provides significantly quicker access to data than does a length of magnetic tape. An effort to reduce the to time to gain access to desired data therefore comprises placing a data storage drive, such a a magnetic disk drive assembly, or a portion of a data storage drive, such as a pack of disks, in a portable cartridge. The use of a pack of disks is not desirable, because of the inability to seal the drive assembly from debris, which leads to a significant reduction in data density and therefore capacity. A pluggable head and disk assembly allows sealing, but has difficulty providing a reliable repeatable, releasable connector for coupling the head signals to the remainder of the electronic circuitry of the drive. An example comprises Japanese Publication 05189861, published Jul. 30, 1993. Portable modular disk drives, not intended for repeated coupling and decoupling use in automated data storage libraries, have been disclosed. U.S. Pat. Nos. 5,253,133 and 6,154,360 are examples. The disk drive of U.S. Pat. No. 6,154,360 additionally shows a flex cable and three shock pads, but a PCB connector of the drive is placed at the same end of the cartridge as the cable connector of the cartridge, and a flex cable between the two is very short and wound over a shock pad, limiting its flexibility. As the result, a plurality of slits are cut in the flex cable to provide a measure of lateral flexibility. Additionally, a single pluggable connector is employed to connect to the drive, which may have reliability concerns if connected and disconnected often.

With the use of a data storage drive in a portable cartridge, upon inserting the portable data storage cartridge in a transfer station port, the drive can be brought up to speed and the data accessed. Once the drive is at speed, additional data can be accessed quickly.

However, as discussed above, an issue comprises the repeatability and reliability of the connection between the external interface of the portable data storage cartridge and the interface of the transfer station port. Additionally, in an automated data storage library, the time required to find, access, transport, and load the cartridge in the drive, before accessing the desired data, remains significant.

SUMMARY OF THE INVENTION

An object of the present invention is to provide greater reliability of the connection between an external interface of a portable data storage cartridge containing a data storage drive and an interface of a transfer station port.

Another object of the present invention is to provide for a reduced time to access desired data of a portable data storage cartridge containing a data storage drive, when the cartridge is stored on a storage shelf of an automated data storage library.

A portable data storage drive cartridge is disclosed with external interfaces positioned respectively at opposite ends of a cartridge shell. The external interfaces are arranged to present similar external interfaces when the cartridge shell is respectively in a first direction and when the cartridge shell is rotated end over end to a reverse direction with respect to the opposite ends. An encased, self-contained data storage drive, having an interface, is mounted in the cartridge. The data storage drive is positioned in the cartridge shell such that the drive interface is positioned toward a first end and away from a second end of the opposite ends of the cartridge shell.

Dual flex cables extend from the drive interface. Specifically, a first of the flex cables extends from the data storage drive interface around the data storage drive to the external interface at the second end of the opposite ends of the cartridge shell, and a second of the flex cables extends from the data storage drive interface, initially around the data storage drive toward the second end of the opposite ends of the cartridge shell, and reverses direction and extends to the external interface at the first end of the opposite ends of the cartridge shell.

Thus, the portable data storage drive cartridge may be rotated from one of the opposite directions end over end to a reverse of the opposite directions. In the event one of the external interfaces becomes unreliable, the portable data storage drive cartridge may be rotated end over end so that the other external interface is utilized.

If a mobile transfer station port is provided on a picker of an automated data storage library, it may provide data transfer with respect to a data storage drive portable data storage cartridge at one of the external interfaces during transport of the data storage drive portable data storage cartridge to a data storage transfer station port. When the cartridge arrives at the transfer station port, a picker then inserts the cartridge at the port to provide data transfer with respect to the other of the external interfaces of the data storage drive portable data storage cartridge. Thus, the external interfaces at each end of the cartridge reduce the time to initially access data on the cartridge.

For a fuller understanding of the present invention, reference should be made to the following detailed description taken in conjunction with the accompanying drawings.

BRIEF DESCRIPTION OF THE DRAWINGS

FIG. 4 is a diagrammatic representation of a side view of a prior art portable data storage cartridge and flex cable;

FIGS. 5–8 are diagrammatic representations of side views of alternative embodiments of a portable data storage cartridge in accordance with the present invention;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
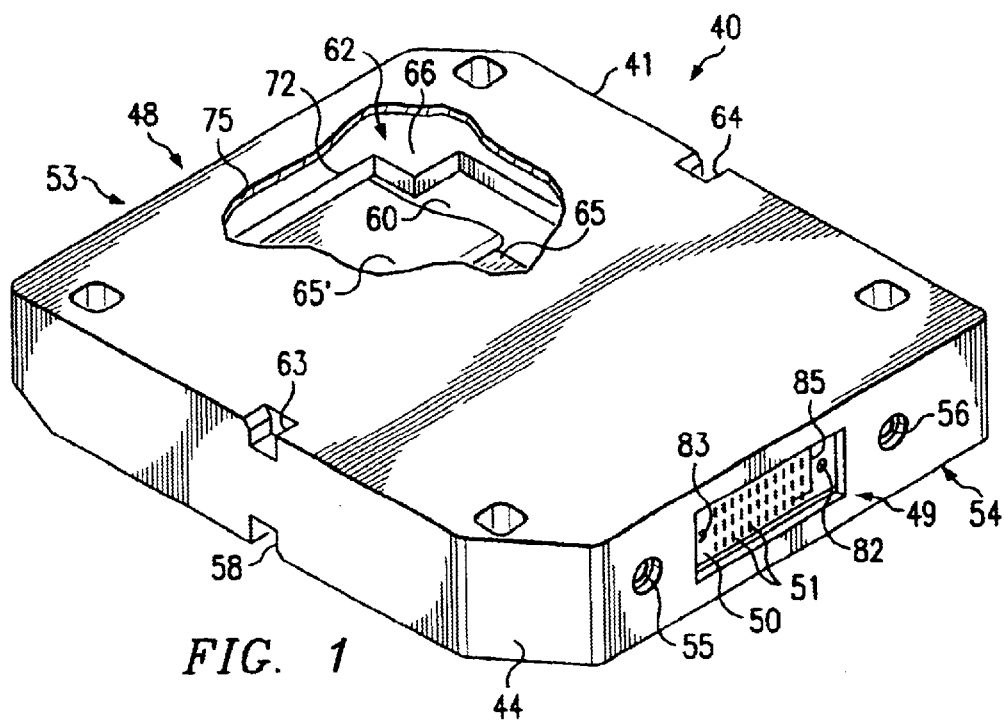
FIG. 1 is a partially cut away isometric view of the portable data storage cartridge in accordance with the present invention.
Figure 2:
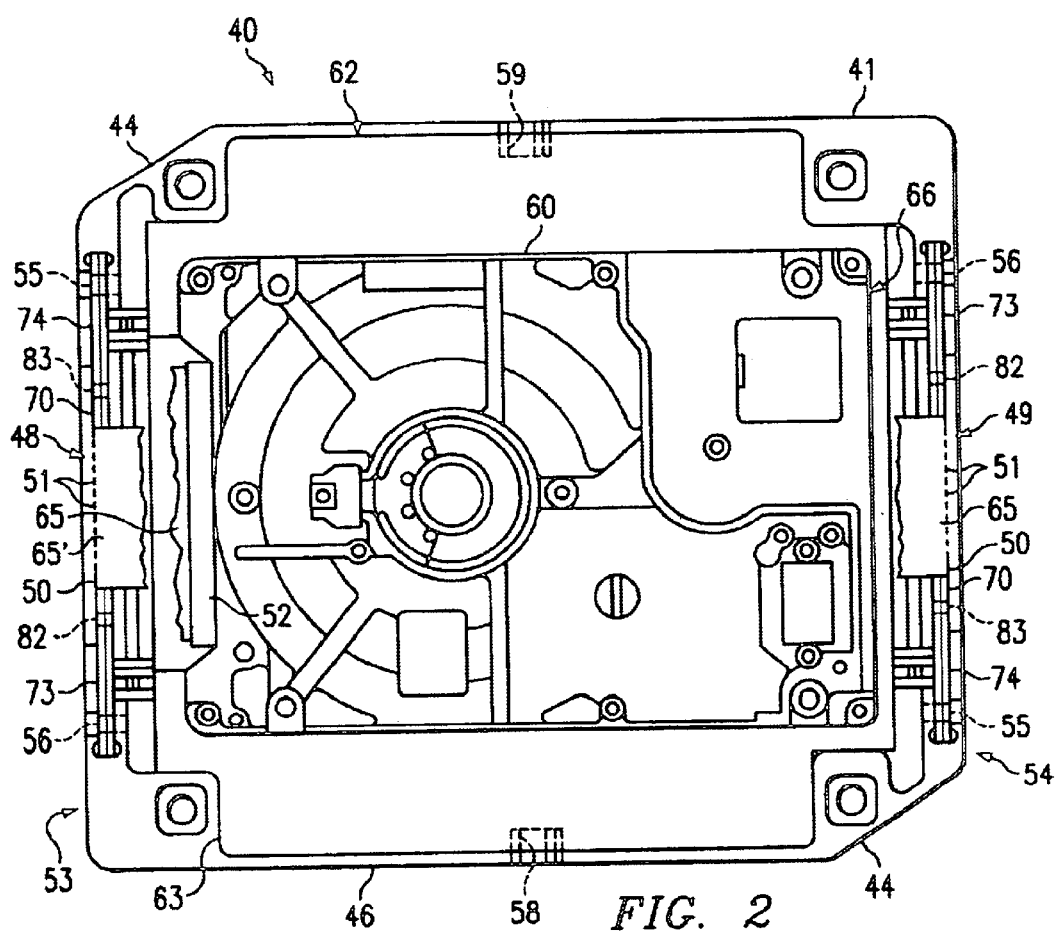
FIG. 2 is a plan view illustration of a bottom half of the portable data storage cartridge of FIG. 1, with a data storage drive.

Referring to FIGS. 1 and 2, a portable data storage drive cartridge 40 is shown in accordance with the present invention, comprising a cartridge shell 41 disclosed with external interfaces 48 and 49 positioned respectively at opposite ends 53 and 54 of the cartridge shell. The external interfaces are arranged to present similar external interfaces when the cartridge shell is respectively in a first direction and when the cartridge shell is rotated end over end to a reverse direction with respect to the opposite ends. Thus, in the event one of the external interfaces becomes unreliable, the portable data storage drive cartridge may be rotated end over end so that the other external interface is utilized.

A data storage drive 60, such as an operational magnetic disk drive assembly, is mounted in the cartridge, and has a drive interface 52. The data storage drive 60 is preferably encased, self-contained and operational, comprising both the necessary mechanical and electronic components. In the context of an encased magnetic disk drive assembly, the assembly comprises at least one rotatable disk, a motor for rotating the disk(s), at least one head, an actuator and servo system for seeking and tracking, and addressing, motor control, and data handling electronics for reading and writing data, and for communicating at the data transfer interface, for example, employing an industry standard format, such as IDE, SCSI or PCI. An example of an encased, self contained, magnetic data storage drive of the desired form factor to fit within the cartridge shell 41 comprises the IBM Travelstar 2.5 inch series of magnetic data storage drives. Specifically, FIG. 2 illustrates the bottom half 46 of the cartridge shell 41 and illustrates the data storage drive 60.

The data storage drive 60 is positioned in the cartridge shell 41 such that the drive interface 52 is positioned toward a first end 53 and away from a second end 54 of the opposite ends of the cartridge shell.

Figure 3:
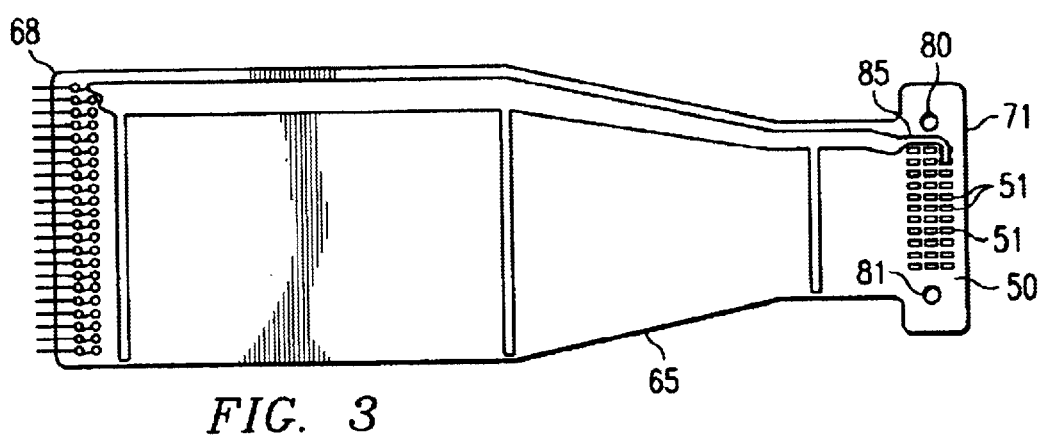
FIG. 3 is a plan view illustration of a flex cable of the portable data storage cartridges of FIGS. 1 and 2.

Referring additionally to FIG. 3, a flex cable 65 is illustrated which, as dual flex cables 65 and 65' in FIGS. 1 and 2, extend from the drive interface 52, separately interconnecting the drive interface 52 with the external interface 48 and the external interface 49.

In FIGS. 1 and 2, the flex cable connecting the drive interface 52 to the external interface 49 is designated as flex cable 65 and the flex cable connecting the drive interface 52 to the external interface 48 is designated as flex cable 65', and are both represented by the example of a flex cable 65 of FIG. 3. The flex cables may be identical, or may be similar and not identical, and manufacturing costs are reduced if the flex cables are identical. Specifically, one of the flex cables 65 extends from the data storage drive interface 52 around the data storage drive 60 to the external interface 49 at the second end 54 of the opposite ends of the cartridge shell, and the second of the flex cables 65' extends from the data storage drive interface 52 initially around the data storage drive 60 toward the second end of the opposite ends of the cartridge shell and reverses direction and extends to the external interface 48 at the first end 53 of the opposite ends of the cartridge shell.

The dual flex cables 65 and 65', and the external interfaces 48, 49 provide redundant external interfaces coupled to the data storage drive 60, such that, in the event one of the external interfaces becomes unreliable, the portable data storage drive cartridge 40 may be rotated from one of the opposite directions end over end to a reverse of the opposite directions, so that the other external interface is utilized.

If a mobile transfer station port is provided on a picker of an automated data storage library, it may provide data transfer with respect to a data storage drive portable data storage cartridge at one of the external interfaces during transport of the data storage drive portable data storage cartridge to a data storage transfer station port. When the cartridge arrives at the transfer station port, a picker then inserts the cartridge at the port to provide data transfer with respect to the other of the external interfaces of the data storage drive portable data storage cartridge. Thus, the external interfaces at each end of the cartridge reduce the time to initially access data on the cartridge.

In one embodiment, the flex cable 65 and external interfaces 48 and 49 are those discussed in U.S. patent application Ser. No. 09/842029, filed Apr. 26, 2001. Specifically, the external interface connectors 48 and 49 incorporate a substrate 50, having electrical contacts 51 on a facing surface of the substrate. The electrical contacts 51 are arranged to match electrical contacts of a transfer station port, when in a face-to-face relationship. As discussed in the application Ser. No. 09/842029, a flex cable, such as flex cables 65, 65', both provides the electrical contacts 51 at a it termination 71 and interconnects the data storage drive 60 and the external data transfer interface 48, 49, while also isolating mechanical contact between the data storage drive and the cartridge shell 41, thereby insuring the full separation and mechanical isolation of the data storage drive 60, from the cartridge shell 41. As the result, the data storage drive is protected from rough handling and is able to withstand the dropping or rough handling of the cartridge.

Referring to FIGS. 1 and 2, as discussed in the application Ser. No. 09/842029, alignment, or registration, holes 55 and 56 are provided and mate with corresponding alignment pins of a port to laterally align and register the external interface 48, 49 of the portable cartridge 40 with an interface of the port.

In one aspect of the present invention, first and second sets of notches 58, 59 and 63, 64 are provided at, respectively the bottom and top of the cartridge. Notches 58 and 59 allow a loader of the transfer station port to engage the portable data storage cartridge 40 and to force the electrical contacts 51 of the external interface 49 into non-wiping contact with matching electrical contacts of the transfer station port, and notches 63 and 64 allow the loader to engage the cartridge and to force the electrical contacts 51 of the external interface 48 into non-wiping contact with matching electrical contacts of the transfer station port.

A shock mount 62 supports and mounts the data storage drive within the cartridge shell 41. Specifically, in accordance with another aspect of the present invention, an opening is provided in the shock mount adjacent at least one of the top side and the bottom side of the data storage drive, in which opening one of the dual flex cables reverses direction. In the example of FIG. 1, the opening 72 is provided in the shock mount adjacent the top side of the data storage drive 60. The data storage drive 60 is supported in the vertical direction by means of a corner projection 66 at each corner of the opening 72. Thus, the shock mount 62 is arranged to insure that the data storage drive 60 is fully separated from and isolated from potential mechanical contact with the cartridge shell 41 or the external interfaces 48, 49, while retaining the conformational integrity of the opening 72. The shock mount 62 may comprise any suitable material of a suitable density, such as a foam material. Specifically, the density is based on the mass of the data storage drive and the contact area between the drive and the shock mount. As examples, EAR Specialties has named a less dense material "CF 45M" and a more dense material "CF 47M".

Referring in more detail to FIGS. 1–3, as discussed in the application Ser. No. 09/842029, a substantially flat backing plate 70 is provided which supports and mounts a termination 71 of the flex cable 65 of FIG. 3, forming the external interface 48, 49. The backing plate 70 and flex cable termination 71 snap into slots 73 and 74 in the cartridge shell 41 for mechanical support. The backing plate 70 thus supports and positions a facing surface 50 of the flex cable 65 to form the external interface.

The flex cable 65 comprises a plurality of lands coupled to the electrical contacts 51 of the facing surface 50 at the termination 71, and are coupled to the data storage drive interface 52, for example, at termination 68.

Referring additionally to FIG. 4, which shows an embodiment of a single flex cable 65 of the application Ser. No. 09/842029 Application, the backing plate 70 is in the general form of an "H" beam, with a front portion 77 supporting and positioning the flex cable termination 71, and a rear portion 78 which provides structural strength. As is discussed therein, the data storage cartridge 40, when loaded into the transfer station port, will be subjected to considerable force in a direction normal to the facing surface 50, to effect the non-wiping contact with the transfer station port data transfer interface, requiring that the backing plate have considerable structural strength, for example, comprising a hard, durable plastic. Examples of plastics having good if structural strength comprise "Ryton", a polyphenylene sulphide resin from Phillips 66; "Ultem", a polyetherimide resin from GE, and "Lexan", a polycarbonate from GE.

Further, the alignment, or registration, holes 55 and 56 are provided in the substantially flat backing plate 70 in close proximity to the substantially flat substrate 50 of the flex cable. The substrate 50 of the flex cable termination 71 is aligned with respect to the backing plate 70 at the time of assembly by use of a probe inserted through holes 80 and 81 of the termination 71 and into holes 82 and 83, respectively, of the backing plate 70. Thus, the substantially flat substrate facing surface 50 is aligned with respect to the backing plate 70 and the alignment or registration holes 55 and 56 therein. As discussed above, the alignment holes are arranged for mating with corresponding transfer station port alignment pins to register the external interface 48, 49 with respect to the transfer station port.

The flex cable 65 couples to the data storage drive, to provide data transfer with the contacted transfer station port, and may be coupled to a power input of the data storage drive to provide power from the transfer station port to the data storage drive, employing lands of the flex cable 65. Also illustrated is a land 85 of flex cable 65, which may form an electrostatic discharge path from the data storage drive to the backing plate 70 and through the backing plate to the alignment pins of the transfer station port, which are electrically grounded.

A corner notch 44 is illustrated at each end of the cartridge shell 41, and allows the cartridge to conform to the exterior dimensional form factor of a tape cartridge with its leader block, such that the cartridge may be stored in the same storage shelves of an automated data storage library as tape cartridges.

As discussed above, FIG. 4 shows an embodiment of a single flex cable 65 of the application Ser. No. 09/842029 coupling an interface 87 of a data storage element 86 to an external interface 88 of a cartridge.

Four embodiments of the arrangement of the present invention are illustrated in FIGS. 5–8. In each embodiment, a portable data storage drive cartridge 40 comprises a cartridge shell 41 with external interfaces 48 and 49 positioned respectively at opposite ends 53 and 54 of the cartridge shell. The external interfaces are arranged to present similar external interfaces when the cartridge shell is respectively in a first direction and when the cartridge shell is rotated end over end to a reverse direction with respect to the opposite ends. A data storage drive 60 is mounted in the cartridge shell 41 by means of a shock mount 66 having at least one opening 72, 75. Dual flex cables 65 and 65' extend from the drive interface 52 of a data storage drive 60. A first of the flex cables 65 extends from the data storage drive interface 52 around the data storage drive 60 to the external interface 49 at the second end 54 of the opposite ends of the cartridge shell, and a second of the flex cables 65' extends from the data storage drive interface 52 initially around the data storage drive 60, into an opening 72, 75, toward the second end 54 of the opposite ends of the cartridge shell and reverses direction within the opening and extends to the external interface 48 at the first end 53 of the opposite ends of the cartridge shell. The flex cable may comprise any suitable flex cable, for example, comprising the flex cable of the application Ser. No. 09/842029, or, as will be discussed, may alternatively comprise any commercially available flex cable coupled to a standard connector, the flex cable comprising, for example, a polyimide base material having plated copper lands.

In the embodiment of FIG. 5, the encased, self-contained data storage drive 60 has at least a top side 91 and a bottom side 92, and the first of the flex cables 65 is coupled to the drive interface 52 and extends around the data storage drive 60 at the top side 91 of the data storage drive to the external interface 49 at the second end 54 of the cartridge, and the second of the flex cables 65' extends initially around the data storage drive into the opening 72 in the shock mount 62 and reverses direction at the top side 91 of the data storage drive, extending back to the external interface 48 at the first end 53 of the cartridge.

In the embodiment of FIG. 6, the encased, self-contained data storage drive 60 has at least a top side 91 and a bottom side 94, and the first of the flex cables 65 extends from the drive interface 52 around the data storage drive at the top side 91 to the external interface 49 at the second end 54 of the cartridge, and the second of the flex cables 65' extends initially from the drive interface 52 around the data storage drive and into the opening 75 in the shock mount 62, reversing direction at the bottom side 94 of the data storage drive, and extending back to the external interface 48 at the first end 53 of the cartridge.

In the embodiment of FIG. 7, the encased, self-contained data storage drive 60 has at least a top side 91 and a bottom side 94, as above. The first of the flex cables 65 extends from the drive interface 52 around the data storage drive at the bottom side 94 of the data storage drive to the external interface 49 at the second end 54 of the cartridge. The second of the flex cables 65' extends from the drive interface 52 initially around the data storage drive at the top side 91 of the data storage drive and into the opening 72 in the shock mount 62, and reverses direction in the opening 72, and extends back to the external interface 48 at the first end 53 of the cartridge.

The embodiment of FIG. 8 is the inverse of that of FIG. 5, wherein the encased, self-contained data storage drive 60 has at least a top side 91 and a bottom side 92. The first of the flex cables 65 is coupled to the drive interface 52 and extends around the data storage drive 60 at the bottom side 94 of the data storage drive to the external interface 49 at the second end 54 of the cartridge, and the second of the flex cables 65' extends initially around the data storage drive into the opening 75 in the shock mount 62 and reverses direction at the bottom side 94 of the data storage drive, extending back to the external interface 48 at the first end 53 of the cartridge.

FIG. 9 illustrates an alternative embodiment of the portable data storage cartridge 40, wherein the cartridge 100 employs standard pin connectors 102 at external interfaces to couple to a transfer station port. Specifically, the pin connectors 102 of the external interfaces 48 and 49 mate with corresponding facing pin connectors of a transfer station port, when in a face-to-face relationship. The flex cables are similar to those illustrated in FIG. 3, but the termination 71 instead is similar to termination 68 for coupling to a pin connector 102. The flex cables are routed in the same manner as those discussed in the embodiments of FIGS. 5–8.

Figure 9A:
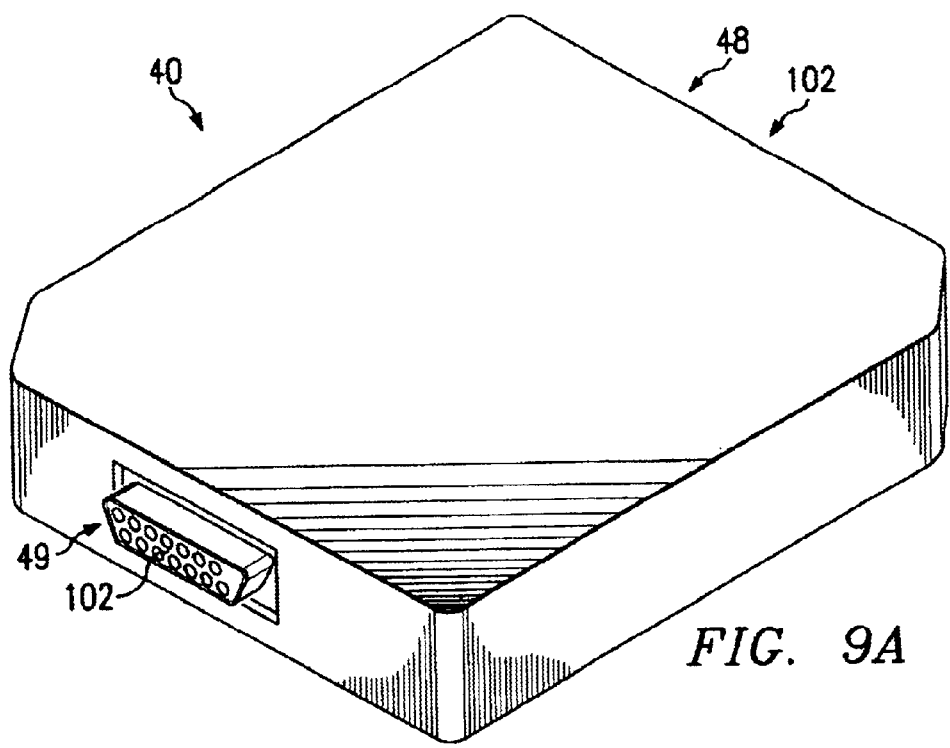
FIGS. 9A and 9B are isometric views of an alternative embodiment of the portable data storage cartridge of FIG. 1.
Figure 9B:
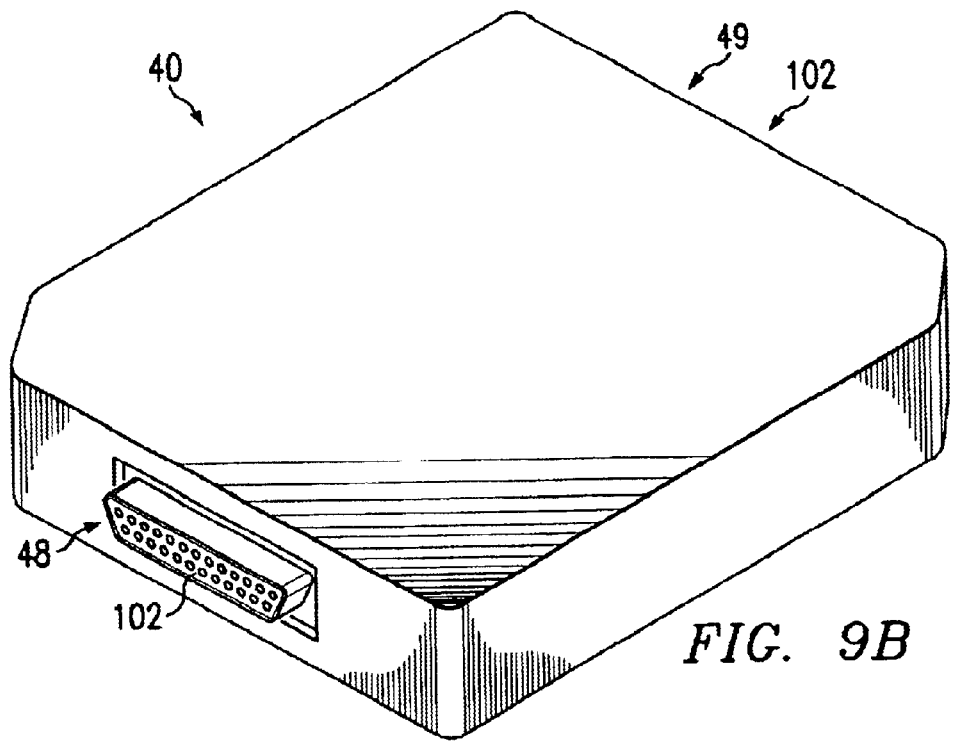

FIGS. 9A and 9B illustrate an alternative embodiment of the portable data storage cartridge 40, wherein the cartridge 100 employs standard pin connectors 102 at external interfaces to couple to a transfer station port. Specifically, the pin connectors 102 of the external interfaces 48 and 49 mate with corresponding facing pin connectors of a transfer station port, when in a face-to-face relationship. The flex cables are similar to those illustrated in FIG. 3, but the termination 71 instead is similar to termination 68 for coupling to a pin connector 102. The flex cables are routed in the same manner as those discussed in the embodiments of FIGS. 5–8.

Figure 10:
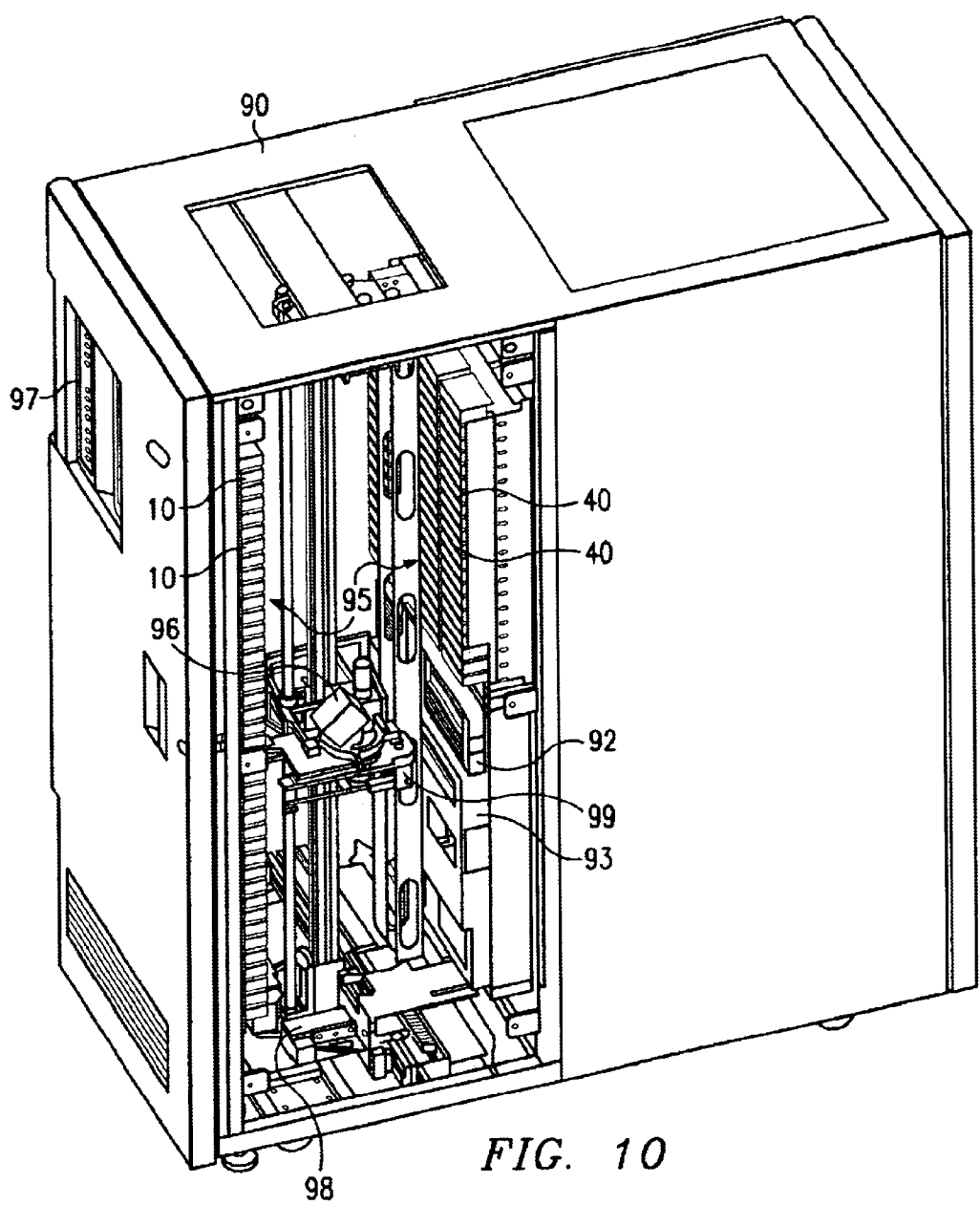
FIG. 10 is an isometric view of an automated data storage library for storing and transporting portable data storage cartridges, including portable data storage cartridges in accordance with the present invention.

FIG. 10 illustrates an example of an automated data storage library 90 for storing, transporting, and providing data transfer with respect to tape cartridges 10 and portable data storage cartridges 40. The library 90 comprises at least one, and preferably a plurality of, data storage drives 92 for reading and/or writing data on data storage media, such as the tape cartridges 10. Additionally, the library comprises at least one, and preferably a plurality of, transfer station ports 93 for providing data transfer with respect to the data storage cartridges 40. Both the tape cartridges 10 and the data storage cartridges 40 are stored in storage shelves 95. The various cartridges may be stored in a segregated manner or may be stored randomly throughout the storage shelves. A typical automated data storage library also comprises one or more input/output stations 97 at which a cartridge may be received or delivered. A robot accessor 98, including a picker 99, grips and transports a selected cartridge 10 or 40 amongst a storage shelf 95, an input/output station 97, a transfer station port 93 and/or a data storage drive 92. The automated data storage library robot accessor may also include a media sensor 96, which is able to identify the cartridges, such as by means of a label placed on the cartridge which is read by a bar code reader. As another example, the VOLSER may be in recorded in an RF chip in the cartridge which is read by an RF receiver.

Figure 11:
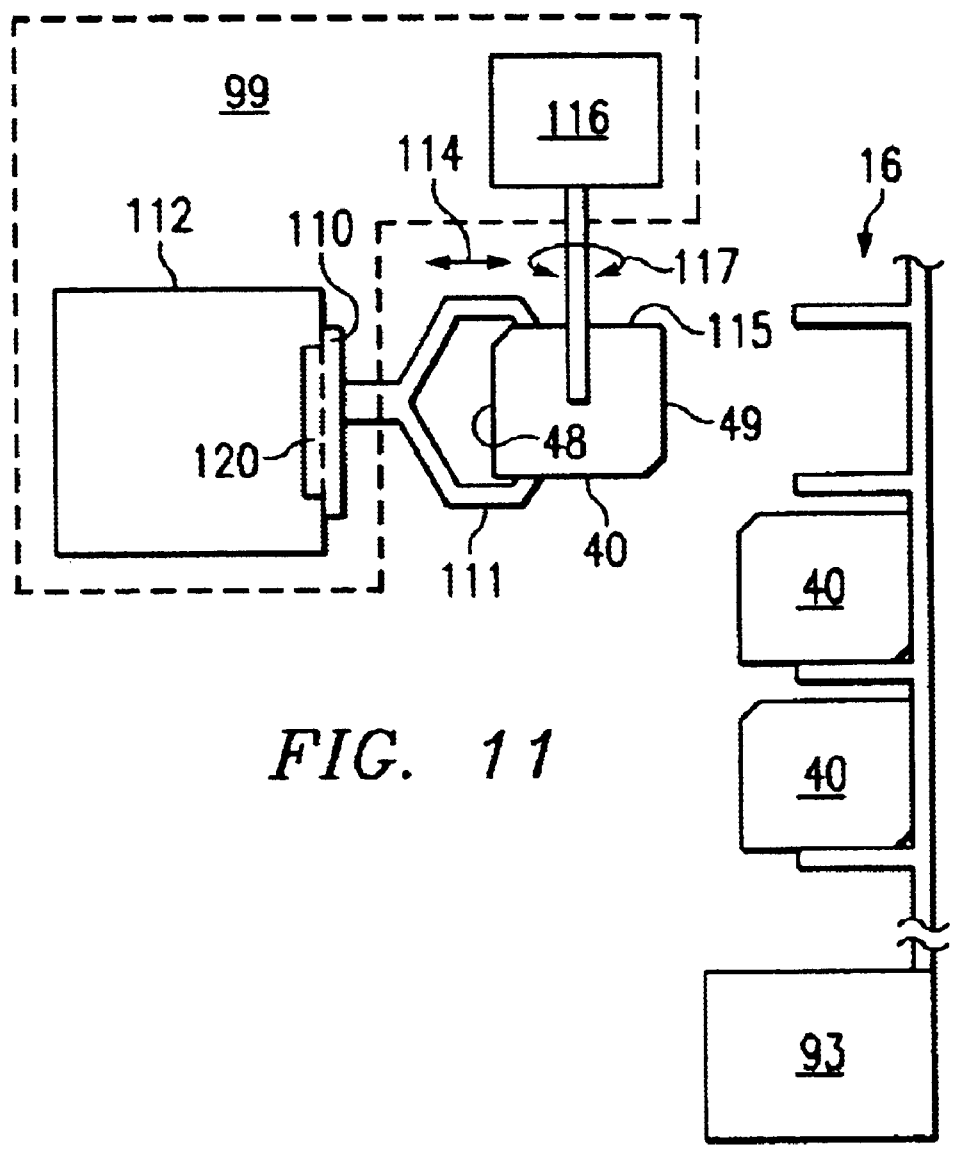
FIG. 11 is a diagrammatic illustration of a modification to the automated data storage library of FIG. 10 which includes a transfer station port and a cartridge rotator mounted on a picker of the library.

In FIG. 11, the picker 99 is modified to rotate the portable data storage drive cartridge may be rotated from one of the opposite directions end over end to a reverse of the opposite directions; and is also modified to provide a mobile transfer station port 110 on the picker.

The picker 99 comprises a gripper 111 and servo 112 to move the gripper into engagement with a cartridge 40, e.g., at a storage shelf 16, to grip and hold the cartridge, and to withdraw the cartridge from the storage shelf, in the direction of arrows 114. The picker is modified to engage the withdrawn cartridge with a second gripper 115, and, upon doing so, releases gripper 111. Motor 116 causes the second gripper 115 to rotate 180 degrees in the direction of arrows 117, such that the portable data storage drive cartridge 40 is rotated from one of the opposite directions end over end to a reverse of the opposite directions. Gripper 111 then re-engages the cartridge 40, and second gripper 115 releases the cartridge. In the event one of the external interfaces becomes unreliable, the second gripper 115 and motor 116 rotate the portable data storage drive cartridge end over end so that the other external interface is utilized. Thus, the reliability of the cartridge is improved substantially due to the dual flex cables and dual external interfaces.

The mobile transfer station port 110 is provided with a port interface 120. The gripper 111, upon withdrawing a cartridge 40 from a storage shelf, moves the cartridge in the direction of arrows 114 to the port 110 such that one of the external interfaces of the cartridge, e.g., interface 48, engages the port interface 120.

Thus, the mobile transfer station port 110 provides data transfer with respect to the data storage drive portable data storage cartridge 40 at one of the external interfaces during transport of the data storage drive portable data storage cartridge to a data storage transfer station port 93. As the cartridge arrives at the data storage port, the gripper withdraws the cartridge 40 from the transfer station port 110 and inserts the cartridge at the transfer station port 93 to provide data transfer with respect to the other of the external interfaces, e.g., interface 49, of the data storage drive portable data storage cartridge. Thus, the external interfaces 48, 49 at each end of the cartridge reduce the time to initially access data on the cartridge.

Those of skill in the art understand that changes may be made to the specific configuration of the data storage drive, the external interfaces, the data storage drive interface, the flex cable, the shock mount, and the cartridge shell in accordance with the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A portable data storage drive cartridge, comprising:
a cartridge shell having at least two opposite ends, comprising respectively a first end and a second end;
external interfaces positioned respectively at said opposite ends of said cartridge shell, said external interfaces arranged to present similar external interfaces when said cartridge shell is respectively in a first direction and rotated end over end to a reverse direction with respect to said opposite ends of said cartridge shell;
an encased, self-contained data storage drive having an interface, said data storage drive mounted in said cartridge shell and positioned such that said interface is positioned toward said first end of said opposite ends and away from said second end of said opposite ends of said cartridge shell; and
dual flex cables, a first of said flex cables extending from said data storage drive interface around said data storage drive to said external interface at said second end of said opposite ends of said cartridge shell, and a second of said flex cables extending from said data storage drive interface initially around said data storage drive toward said second end of said opposite ends of said cartridge shell and reversing direction and extending to said external interface at said first end of said opposite ends of said cartridge shell.

2. The portable data storage cartridge of claim 1, wherein said encased, self-contained data storage drive has at least a top side and a bottom side, and additionally comprising a shock mount mounting said encased, self-contained data storage drive in said cartridge shell, said shock mount having an opening adjacent at least one of said top side and said bottom side of said encased, self-contained data storage drive, such that said second of said flex cables extends from said data storage drive interface into said opening and reverses said direction within said opening.

3. The portable data storage cartridge of claim 1, wherein said encased, self-contained data storage drive comprises a magnetic disk drive assembly.

4. The portable data storage cartridge of claim 1, wherein said external interfaces and said data storage drive interface each comprise data transfer and power interfaces, whereby said external interfaces and said flex cables both allow the transfer of data with respect to said data storage drive and allow the provision of power to said data storage drive.

5. The portable data storage cartridge of claim 1, wherein said cartridge shell additionally comprises first and second sets of loading slots arranged to be effective for loading and unloading said portable data storage cartridge from a transfer station port, respectively when said cartridge shell is in said first and in said reverse directions with respect to said opposite ends of said cartridge shell.

6. The portable data storage cartridge of claim 1, wherein said encased, self-contained data storage drive has at least a top side and a bottom side, and said first of said flex cables extends around said data storage drive to said external interface at one of said top side and said bottom side of said data storage drive, and said second of said flex cables extends initially around said data storage drive and reverses direction at said one of said top side and said bottom side of said data storage drive.

7. The portable data storage cartridge of claim 1, wherein said encased, self-contained data storage drive has at least a top side and a bottom side, and said first of said flex cables extends around said data storage drive to said external interface at said bottom side of said data storage drive, and said second of said flex cables extends initially around said data storage drive and reverses direction at said top side of said data storage drive.

8. The portable data storage cartridge of claim 1, wherein said encased, self-contained data storage drive has at least a top side and a bottom side, and said first of said flex cables extends around said data storage drive to said external interface at said top side of said data storage drive, and said second of said flex cables extends initially around said data storage drive and reverses direction at said bottom side of said data storage drive.

9. The portable data storage cartridge of claim 1, wherein said external interfaces are substantially identical, such that, in one said direction with respect to said opposite ends, said external interface at said first end is coupleable to a port interface, and upon rotating said cartridge end of end with respect to said opposite ends, said external interface at said second end is coupleable to said port interface.

10. A portable data storage drive cartridge, comprising:
a cartridge shell having at least two opposite ends, comprising respectively a first end and a second end;
a first external interface positioned at said first end of said opposite ends of said cartridge shell;
a second external interface positioned at said second end of said opposite ends of said cartridge shell;
a data storage drive having a drive interface, and comprising at least a top side and a bottom side;
a shock mount mounting said data storage drive in said cartridge shell, positioned such that said drive interface is positioned toward said first end of said opposite ends and away from said second end of said opposite ends of said cartridge shell; said shock mount having an opening adjacent at least one of said top side and said bottom side of said data storage drive; and
dual flex cables, a first of said flex cables extending from said data storage drive interface around said data storage drive to said external interface at said second end of said opposite ends of said cartridge shell, and a second of said flex cables extending from said data storage drive interface initially around said data storage drive into said opening toward said second end of said opposite ends of said cartridge shell and reversing direction within said opening, and extending to said external interface at said first end of said opposite ends of said cartridge shell.

11. The portable data storage drive cartridge of claim 10, wherein said data storage drive comprises an encased, self-contained magnetic disk drive assembly.

12. The portable data storage drive cartridge of claim 10, wherein said first and said second external interfaces and said drive interface each comprises data transfer and power interfaces, whereby said interfaces and said flex cables both allow the transfer of data with respect to said data storage drive and allow the provision of power to said data storage drive.

13. The portable data storage drive cartridge of claim 10, wherein said encased, self-contained data storage drive has at least a top side and a bottom side, and said first of said flex cables extends around said data storage drive to said external interface at one of said top side and said bottom side of said data storage drive, and said second of said flex cables extends initially around said data storage drive and reverses direction at said one of said top side and said bottom side of said data storage drive.

14. The portable data storage drive cartridge of claim 10, wherein said encased, self-contained data storage drive has at least a top side and a bottom side, and said first of said flex cables extends around said data storage drive to said external interface at said bottom side of said data storage drive, and said second of said flex cables extends initially around said data storage drive and reverses direction at said top side of said data storage drive.

15. The portable data storage drive cartridge of claim 10, wherein said encased, self-contained data storage drive has at least a top side and a bottom side, and said first of said flex cables extends around said data storage drive to said external interface at said top side of said data storage drive, and said second of said flex cables extends initially around said data storage drive and reverses direction at said bottom side of said data storage drive.

16. The portable data storage drive cartridge of claim 10, wherein said external interfaces are substantially identical, such that, in one said direction with respect to said opposite ends, said external interface at said first end is coupleable to a port interface, and upon rotating said cartridge end of end with respect to said opposite ends, said external interface at said second end is coupleable to said port interface.

17. A portable magnetic disk drive cartridge, comprising:
   a cartridge shell having at least two opposite ends, comprising respectively a first end and a second end;
   external interfaces positioned respectively at said opposite ends of said cartridge shell, said external interfaces arranged to present similar external interfaces when said cartridge shell is respectively in a first direction and rotated end over end to a reverse direction with respect to said opposite ends of said cartridge shell;
   an encased, self-contained magnetic disk drive assembly having an interface, said magnetic disk drive assembly mounted in said cartridge shell and positioned such that said interface is positioned toward said first end of said opposite ends and away from said second end of said opposite ends of said cartridge shell; and
   dual flex cables, a first of said flex cables extending from said magnetic disk drive assembly interface around said magnetic disk drive assembly to said external interface at said second end of said opposite ends of said cartridge shell, and a second of said flex cables extending from said magnetic disk drive assembly interface initially around said magnetic disk drive assembly toward said second end of said opposite ends of said cartridge shell and reversing direction and extending to said external interface at said first end of said opposite ends of said cartridge shell.

18. The portable magnetic disk drive cartridge of claim 17, wherein said encased, self-contained magnetic disk drive assembly has at least a top side and a bottom side, and additionally comprising a shock mount mounting said encased, self-contained magnetic disk drive assembly in said cartridge shell, said shock mount having an opening adjacent at least one of said top side and said bottom side of said encased, self-contained magnetic disk drive assembly, such that said second of said flex cables extends from said magnetic disk drive assembly interface into said opening and reverses said direction within said opening.

19. The portable magnetic disk drive cartridge of claim 17, wherein said external interfaces and said magnetic disk drive assembly interface each comprise data transfer and power interfaces, whereby said external interfaces and said flex cables both allow the transfer of data with respect to said magnetic disk drive assembly and allow the provision of power to said magnetic disk drive assembly.

20. The portable magnetic disk drive cartridge of claim 17, wherein said cartridge shell additionally comprises first and second sets of loading slots arranged to be effective for loading and unloading said portable data storage cartridge from a transfer station port, respectively when said cartridge shell is in said first and in said reverse directions with respect to said opposite ends of said cartridge shell.

21. The portable magnetic disk drive cartridge of claim 17, wherein said encased, self-contained magnetic disk drive assembly has at least a top side and a bottom side, and said first of said flex cables extends around said magnetic disk drive assembly to said external interface at one of said top side and said bottom side of said magnetic disk drive assembly, and said second of said flex cables extends initially around said magnetic disk drive assembly and reverses direction at said one of said top side and said bottom side of said magnetic disk drive assembly.

22. The portable magnetic disk drive cartridge of claim 17, wherein said encased, self-contained magnetic disk drive assembly has at least a top side and a bottom side, and said first of said flex cables extends around said magnetic disk drive assembly to said external interface at said bottom side of said magnetic disk drive assembly, and said second of said flex cables extends initially around said magnetic disk drive assembly and reverses direction at said top side of said magnetic disk drive assembly.

23. The portable magnetic disk drive cartridge of claim 17, wherein said encased, self-contained magnetic disk drive assembly has at least a top side and a bottom side, and said first of said flex cables extends around said magnetic disk drive assembly to said external interface at said top side of said magnetic disk drive assembly, and said second of said flex cables extends initially around said magnetic disk drive assembly and reverses direction at said bottom side of said magnetic disk drive assembly.

24. The portable magnetic disk drive cartridge of claim 17, wherein said external interfaces are substantially identical, such that, in one said direction with respect to said opposite ends, said external interface at said first end is coupleable to a port interface, and upon rotating said cartridge end of end with respect to said opposite ends, said external interface at said second end is coupleable to said port interface.

* * * * *